United States Patent
Hidaka et al.

(10) Patent No.: US 7,195,098 B2
(45) Date of Patent: Mar. 27, 2007

(54) VARIABLE TRANSMISSION RATIO STEERING APPARATUS

(75) Inventors: Kenichiro Hidaka, Aichi-ken (JP); Masahiro Miyata, Kariya (JP); Takahiro Kojo, Gotenba (JP)

(73) Assignee: Denso Corporation, Kariya (JP)

( * ) Notice: Subject to any disclaimer, the term of this patent is extended or adjusted under 35 U.S.C. 154(b) by 459 days.

(21) Appl. No.: 10/878,576

(22) Filed: Jun. 29, 2004

(65) Prior Publication Data

US 2005/0016788 A1    Jan. 27, 2005

(30) Foreign Application Priority Data

Jul. 23, 2003    (JP)    ............... 2003-278369

(51) Int. Cl.
B62D 5/04    (2006.01)

(52) U.S. Cl. .................................. 180/446; 701/41

(58) Field of Classification Search ............... 180/443, 180/444, 446; 701/41, 42, 43
See application file for complete search history.

(56) References Cited

U.S. PATENT DOCUMENTS

| | | | | |
|---|---|---|---|---|
| 4,932,492 A * | 6/1990 | Sauvageot et al. | .......... | 180/446 |
| 5,205,371 A * | 4/1993 | Karnopp | .................... | 180/444 |
| 5,740,040 A * | 4/1998 | Kifuku et al. | ................ | 701/41 |
| 6,134,490 A * | 10/2000 | Ito et al. | ....................... | 701/42 |
| 6,278,922 B1 * | 8/2001 | Nishiwaki | .................... | 701/41 |
| 6,431,307 B2 * | 8/2002 | Yoshida | ...................... | 180/446 |
| 6,896,090 B2 * | 5/2005 | Kanda et al. | ............... | 180/402 |
| 7,121,378 B2 * | 10/2006 | Hasegawa et al. | .......... | 180/444 |
| 2004/0148078 A1 * | 7/2004 | Nakano et al. | ............... | 701/41 |

FOREIGN PATENT DOCUMENTS

| | | |
|---|---|---|
| DE | 10036937 | 2/2002 |
| JP | 11-152054 | 6/1999 |
| JP | 2001-278087 | 10/2001 |

* cited by examiner

*Primary Examiner*—Anne Marie Boehler
(74) *Attorney, Agent, or Firm*—Posz Law Group, PLC (57) ABSTRACT

A variable transmission ratio steering apparatus for a vehicle is configured with an input shaft coupled to a steering wheel of the vehicle, a sensor for sensing a rotation angle of the input shaft, an output shaft operatively linked to steerable road wheels of the vehicle, an actuator having an electric motor which is configured to vary a transmission ratio between a rotation angle of the output shaft and the rotation angle of the input shaft, and a controller. More specifically, the controller includes a desired rotation angle calculation unit, a difference calculation unit, and a difference limitation unit, whereby a rotation angle of a rotor of the electric motor is limited. With such a configuration, a rotation speed of the rotor of the electric motor can be limited by limiting the rotation angle of the rotor, and consequently, audible operation noises arising from the electric motor can be minimized.

13 Claims, 5 Drawing Sheets

VARIABLE TRANSMISSION RATIO STEERING APPARATUS

BACKGROUND OF THE INVENTION

1. Technical Field of the Invention

The present invention relates to a variable transmission ratio steering apparatus for a vehicle which has the capability of varying the transmission ratio of a steering angle for a steering wheel of the vehicle.

2. Description of the Related Art

Existing variable transmission ratio steering apparatuses for vehicles are generally configured with an input shaft, an output shaft, an actuator, a lock pin, a solenoid coil, and a controller. Such a steering apparatus is proposed, for example, in Japanese Patent Application Laid-Open No. 2001-278087.

In the apparatus, the input shaft is coupled to a steering wheel of the vehicle, and the output shaft is operatively linked to steerable road wheels of the vehicle. The actuator has an electric motor disposed between the input shaft and the output shaft. The electric motor is so configured to vary a transmission ratio between the rotation angle of the output shaft and the rotation angle of the input shaft. The lock pin is provided to connect the input shaft to the output shaft, and the solenoid coil is configured to actuate the lock pin to disconnect the input shaft from the output shaft. The controller controls the driving of the electric motor and the solenoid coil.

In particular, the controller controls the rotation angle of a rotor of the electric motor in response to the vehicle speed. When the vehicle speed is low, the controller drives the electric motor at a high rotation speed, so that the steerable road wheels of the vehicle can be largely steered with a small steering wheel manipulation.

However, in such a configuration, when the rotation speed of the rotor of the electric motor exceeds a certain value, audible operation noises arise from the electric motor, thus causing an uncomfortable feeling for the occupants of the vehicle.

SUMMARY OF THE INVENTION

It is, therefore, an object of the present invention to provide a variable transmission ratio steering apparatus for a vehicle which can minimize the audible operation noises arising from the electric motor of the actuator thereof.

According to the present invention, a variable transmission ratio steering apparatus for a vehicle having a steering wheel and steerable road wheels includes an input shaft, a steering angle sensor, an output shaft, an actuator, and a controller.

The input shaft is coupled to the steering wheel, and the steering angle sensor senses a rotation angle of the input shaft and generates a signal indicative of the sensed rotation angle. The output shaft is operatively linked to the steerable road wheels. The actuator has an electric motor with a rotor, which electric motor is connected between the input shaft and the output shaft and configured to vary a transmission ratio between a rotation angle of the output shaft and the rotation angle of the input shaft.

The controller includes a desired rotation angle calculation unit, a difference calculation unit, and a difference limitation unit.

The desired rotation angle calculation unit calculates, at intervals of a predetermined time, a desired rotation angle of the rotor of the electric motor depending on the signal indicative of the rotation angle of the input shaft from the steering angle sensor.

The difference calculation unit calculates, at intervals of the predetermined time, a difference between a first value and a second value selected from values of the desired rotation angle of the rotor calculated by the desired rotation angle calculation unit. It should be noted that the first value is calculated earlier than the second value by the predefined time.

The difference limitation unit limits, when the difference calculated by the difference calculation unit exceeds a predetermined reference value, the difference to an upper limit thereof.

In the above configuration, the difference between the first value and the second value of the desired rotation angle of the rotor corresponds to a rotation speed of the rotor. Therefore, the rotation speed of the rotor of the electric motor can be limited by limiting the difference through the difference limitation unit, thereby minimizing the audible operation noises arising from the electric motor.

In addition, when the vehicle encounters an unstable event, a signal for securing stabilities of the vehicle is fed to the controller. Then, the controller mandatorily changes the desired rotation angle of the rotor to suppress the unstable behavior of the vehicle, and stops executing functions of the difference limitation unit.

With such a configuration, the vehicle is stabilized and consequently, the safety of the vehicle is assured.

BRIEF DESCRIPTION OF THE DRAWINGS

The present invention will be understood more fully from the detailed description given hereinafter and from the accompanying drawings of the preferred embodiment of the invention, which, however, should not be taken to limit the invention to the specific embodiment but are for the purpose of explanation and understanding only.

In the accompanying drawings.

DESCRIPTION OF THE PREFERRED EMBODIMENT

A variable transmission ratio steering apparatus for a vehicle according to an embodiment of the present invention is described with reference to FIGS. 1–3.

Figure 1:
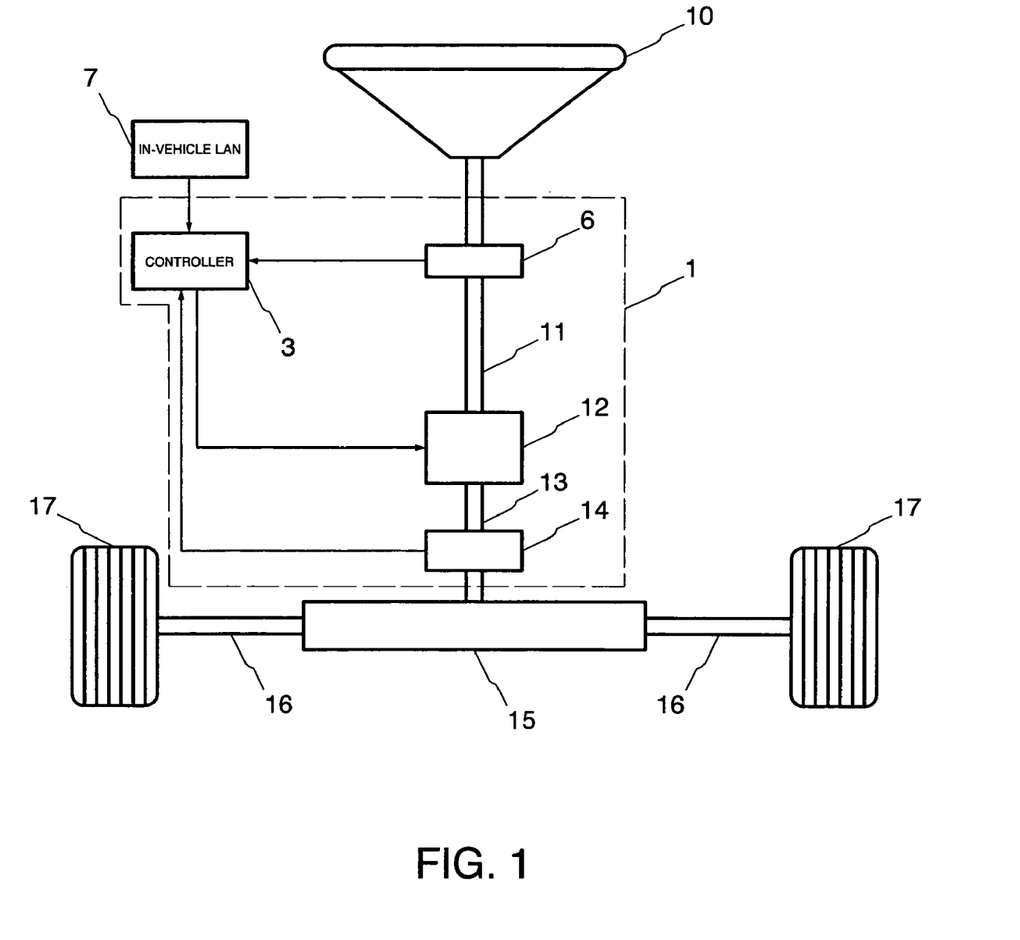
FIG. 1 is a schematic representation illustrating the configuration of a vehicle steering system, which includes a variable transmission ratio steering apparatus, according to an embodiment of the invention.

FIG. 1 shows an overall configuration of a steering system of the vehicle, including a variable transmission ratio steering apparatus 1 which varies the steered angle of steerable road wheels 17 of the vehicle in response to the vehicle speed.

The steering apparatus 1 is configured with a controller 3, an input shaft 11, a transmission ratio varying unit 12, an output shaft 13, a steering angle sensor 6, and a steered angle sensor 14.

As shown in FIG. 1, a steering wheel 10 of the vehicle is connected to the upper end of the input shaft 11. The lower end of the input shaft 11 is operatively connected to the upper end of the output shaft 13 via the transmission ratio varying unit 12. The unit 12 varies a transmission ratio between the rotation angle of the output shaft 13 and the rotation angle of the input shaft 11. The lower end of the output shaft 13 is connected to a pinion (not shown) that engages, within a steering gear box 15, with a rack 16. In addition, an electric power steering apparatus (not shown) is provided within the steering gear box 15, and each of the left and right ends of the rack 16 is connected to the corresponding one of the steerable road wheels 17 of the vehicle via a combination of a tie rod (not shown) and a knuckle arm (not shown) respectively.

Referring further to FIG. 1, the steering angle sensor 6, which senses a steering angle of the steering wheel 10, is mounted on the input shaft 11, and the steered angle sensor 14, which senses the resultant steered angle of the steerable road wheels 17, is mounted on the output shaft 13.

Accordingly, with such a configuration, the steering angle of the steering wheel 10 (hereinafter referred to as a steering angle D1 of the vehicle) is represented by the corresponding rotation angle of the input shaft 11, and the steered angle of the steerable road wheels 17 (hereinafter referred to as a steered angle D2 of the vehicle) is represented by the corresponding rotation angle of the output shaft 13.

Two signals, which are indicative of the steering angle D1 of the vehicle and the steered angle D2 of the vehicle respectively, are generated by the steering angle sensor 6 and the steered angle sensor 14, respectively, and provided to the controller 3. In addition, signals such as a signal indicative of the vehicle speed V and a signal indicative of the engine rotation speed of the vehicle are provided to the controller 3 from an in-vehicle LAN 7.

Based on the provided signals, the controller 3 generates and outputs signals to control the transmission ratio varying unit 12. More specifically, when the vehicle speed V is low, the controller 3 controls the transmission ratio varying unit 12 to allow the transmission ratio to be high, so that the steerable road wheels 17 can be largely steered with a small steering wheel manipulation. On the contrary, when the vehicle speed V is high, the controller 3 controls the transmission ratio varying unit 12 to allow the transmission ratio to be low, so that the steerable road wheels 17 can not be largely steered even when a large manipulation is applied to the steering wheel 10. As a result, the stabilities of the vehicle can be secured.

Figure 2A:
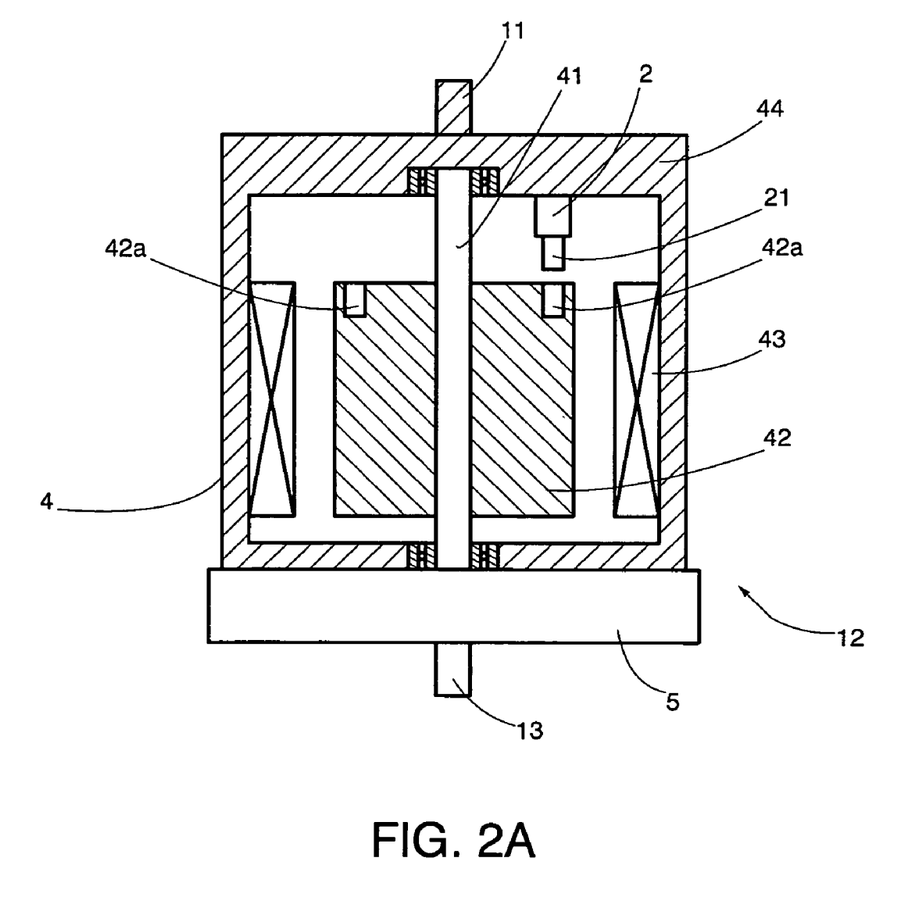
FIG. 2A is an axial sectional view of a transmission ratio varying unit employed by the variable transmission ratio steering apparatus.
Figure 2B:
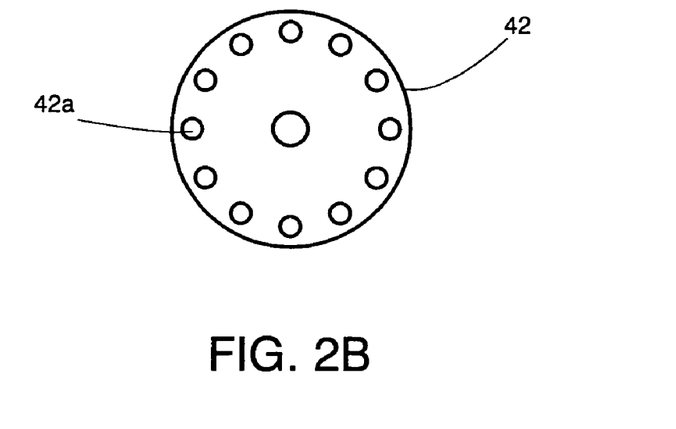
FIG. 2B is an axial end view of a rotor of an electric motor employed by the transmission ratio varying unit.

Referring now to FIG. 2A, the transmission ratio varying unit 12 is provided with an electric motor 4 of the well-known brushless type and a speed reducer 5. The transmission ratio varying unit 12 varies the steered angle D2 of the vehicle by turning the electric motor 4, based on signals provided by both the steering angle sensor 6 and the in-vehicle LAN 7. The electric motor 4 has a stator 43 and a rotor 42, both of which are disposed within a motor housing 44 thereof. In addition, a solenoid coil 2 is provided on the upper inner wall of the motor housing 44. The solenoid coil 2 translates, in a direction parallel to a rotational shaft 41 of the electric motor 4, a lock pin 21 toward the rotor 42 in response to a control signal from the controller 3. On the other hand, as shown in FIG. 2B, a plurality of pin holes 42a are recessed, at even intervals, on the upper end of the rotor 42 along the circumference, one of which is to engage with the lock pin 21.

Additionally, in the present embodiment, the steered angle sensor 14 is mounted on the output shaft 13 as described above, however, it may also be provided between the electric motor 4 and the speed reducer 5 to directly sense an actual rotation angle of the rotational shaft 41. In such a case, the sensed rotation angle of the rotational shaft 41 is provided to the controller 3 instead of the rotation angle of the output shaft 13.

In the above-described steering system, when both the signal indicative of the vehicle speed V from the in-vehicle LAN 7 and the signal indicative of the steering angle D1 of the vehicle from the steering angle sensor 6 are transmitted to the controller 3, a desired rotation angle D3 of the rotor 42 of the electric motor 4 is calculated by the controller 3 based on the received signals. Then, a PWM (Pulse-Width Modulation) signal, which is indicative of a motor control command based on the calculated desired rotation angle D3, is transmitted from the controller 3 to the transmission ratio varying unit 12. According to the motor control command from the controller 3, the electric motor 4 of the transmission ratio varying unit 12 is driven.

More specifically, the controller 3 determines a desired steered angle D2 of the vehicle based on the steering angle D1 of the vehicle and the calculated desired rotation angle D3 of the rotor 42 of the electric motor 4. Further, the controller 3 determines the actual steered angle D2a of the vehicle through the steered angle sensor 14. Then, the controller 3 executes a feedback control to reliably provide the steered wheels 17 with the desired steered angle D2. During the above processes, the solenoid coil 2 is in "ON" state, so that the lock pin 21 is not engaged with any pin hole, that is, the rotor 42 of the electric motor 4 is disconnected from the motor housing 44.

On the other hand, when an abnormal condition of the transmission ratio varying unit 12, for example an earth fault of the solenoid coil 2, is detected by the controller 3, a command signal to stop supplying electric current to the solenoid coil 2 is outputted from the controller 3. Then, the state of the solenoid coil 2 changes to "OFF", and the lock pin 21 of the transmission ratio varying unit 12 is translated toward the rotor 42 in the direction parallel to the rotational shaft 41, thereby engaging the lock pin 21 with one of the plurality of pin holes 42a. As a result, the rotor 42 is connected with the motor housing 44.

Figure 3:
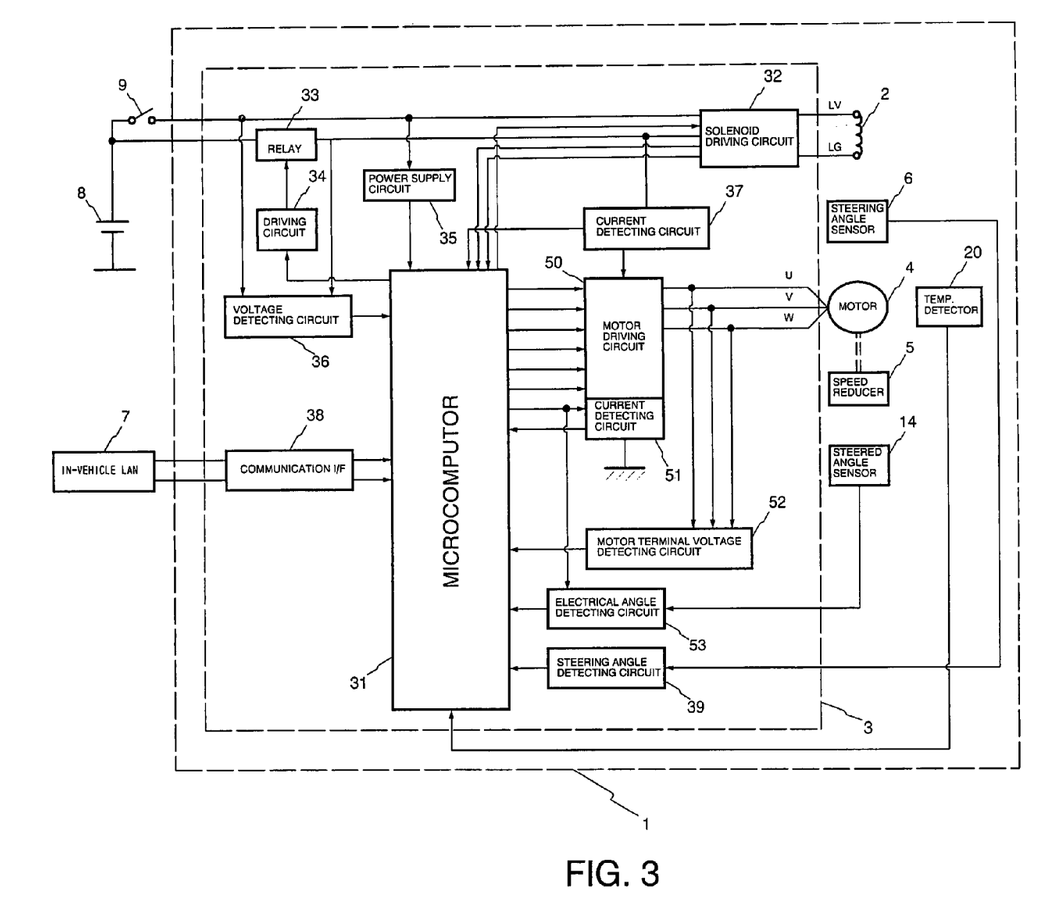
FIG. 3 is a block diagram illustrating an overall circuitry of the variable transmission ratio steering apparatus.

FIG. 3 shows a simplified overall circuitry of the variable transmission ratio steering apparatus 1.

As shown in FIG. 3, the solenoid coil 2 is connected to a solenoid driving circuit 32 of the controller 3 to be described below. The above-described lock pin 21 is actuated by supplying electric current to the solenoid coil 2 in response to a driving signal from the solenoid driving circuit 32.

As described previously, the controller 3 controls the electric current supply to the solenoid coil 2 and the driving of the electric motor 4, based on the signals provided by the steering angle sensor 6 and the in-vehicle LAN 7. The controller 3 is configured with a microcomputer 31, the solenoid driving circuit 32, a relay 33, a driving circuit 34, a power supply circuit 35, a voltage detecting circuit 36, a current detecting circuit 37, a communication I/F 38, a steering angle detecting circuit 39, a motor driving circuit 50, another current detecting circuit 51, a motor terminal voltage detecting circuit 52, and an electrical angle detecting circuit 53.

The microcomputer 31 generates control signals to control the electric current supplies to the solenoid coil 2 and the electronic motor 4, based on the signals from the steering angle sensor 6 and the in-vehicle LAN 7.

The solenoid driving circuit 32, which controls the electric current supply to the solenoid coil 2 so as to actuate the lock pin 21 in response to the control signal from the microcomputer 31, is connected to a battery 8 via the relay 33.

The relay 33 is connected between the battery 8 and the solenoid driving circuit 32. The "ON" and "OFF" states of the relay 33 correspond to the states of the connection and disconnection of the battery 8 with the solenoid driving circuit 32 respectively.

The driving circuit 34 turns "ON" or "OFF" the relay 33 depending on the control signal from the microcomputer 31.

The power supply circuit 35 is connected with the battery 8 via an IG switch 9, thereby supplying the electric current from the battery 8 to the microcomputer 31.

The voltage detecting circuit 36 detects the voltage value of the battery 8, and provides a signal indicative of the detected voltage value to the microcomputer 31.

The current detecting circuit 37 supplies the electric current from the battery 8 to the motor driving circuit 50, detects the value of the electric current being supplied, and provides a signal indicative of the detected electric current value to the microcomputer 31.

The communication I/F 38 converts signals from the in-vehicle LAN 7, such as the vehicle speed V signal and the engine rotation speed signal, to corresponding signals that can be recognized by the microcomputer 31, and transmits the converted signals to the microcomputer 31.

Additionally, in order to suppress unstable behavior of the vehicle, the communication I/F 38 converts command signals from the in-vehicle LAN 7 to mandatorily change the desired rotation angle D3, and transmits the converted command signals to the microcomputer 31. Such a command signal to mandatorily change the desired rotation angle D3 is provided to the communication I/F 38, when, for example, the steered road wheels 17 of the vehicle have experienced a slip.

The steering angle detecting circuit 39 converts the signal from the steering angle sensor 6 to a corresponding steering angle signal which can be recognized by the microcomputer 31, and transmits the converted steering angle signal to the microcomputer 31.

The motor driving circuit 50 includes six switching transistors forming a three-phase bridge circuit, and drives the electric motor 4, through a duty-control of the six switching transistors, in response to the control signal from the microcomputer 31.

The current detecting circuit 51 detects the value of the electric current flowing through the six switching transistors of the motor driving circuit 50, and provides a current signal indicative of the detected value of the electric current to the microcomputer 31.

The motor terminal voltage detecting circuit 52 detects the value of the voltage applied to the six switching transistors, and provides a voltage signal indicative of the detected voltage value to the microcomputer 31.

The electrical angle detecting circuit 53 converts the steered angle signal provided by the steered angle sensor 14 to a corresponding steered angle signal that can be recognized by the microcomputer 31, and transmits the converted steered angle signal to the microcomputer 31.

The speed reducer 5 is also shown in FIG. 3, and the double dashed lines between the motor 4 and the speed reducer 5 are merely for the purpose of showing the mechanical connection therebetween.

Having described the overall circuitry of the variable transmission ratio steering apparatus 1, the operation thereof is now described.

First, the microcomputer 31 issues a control signal to the solenoid driving circuit 32, then the solenoid driving circuit 32 supplies electric current to the solenoid coil 2 to actuate the lock pin 21, thereby disconnecting the rotor 44 from the motor housing 44. Secondly, the microcomputer 31 drives the electric motor 4 based on the signals provided by the steering angle sensor 6 and the in-vehicle LAN 7, so that the turning effort of the electric motor 4 is transmitted to the output shaft 13 via the speed reducer 5. Lastly, a torque sensor of the electric power steering apparatus of the vehicle detects the torque applied to the output shaft 13, and an electric motor of the electric power steering apparatus assists to vary the steered angle of the steerable road wheels 17 of the vehicle.

Figure 4:
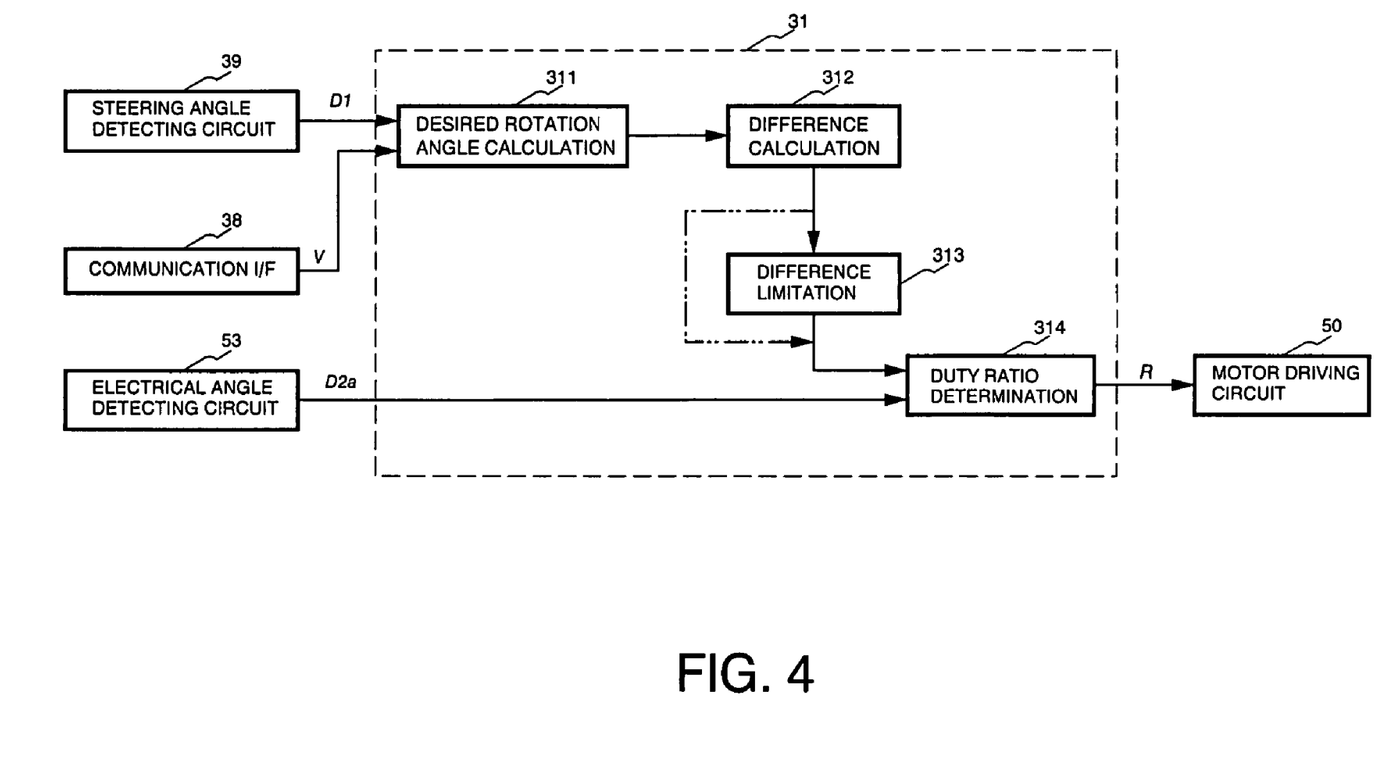
FIG. 4 is a functional block diagram illustrating a controller of the variable transmission ratio steering apparatus to limit the rotation speed of an electric motor of the transmission ratio varying unit.
Figure 5:
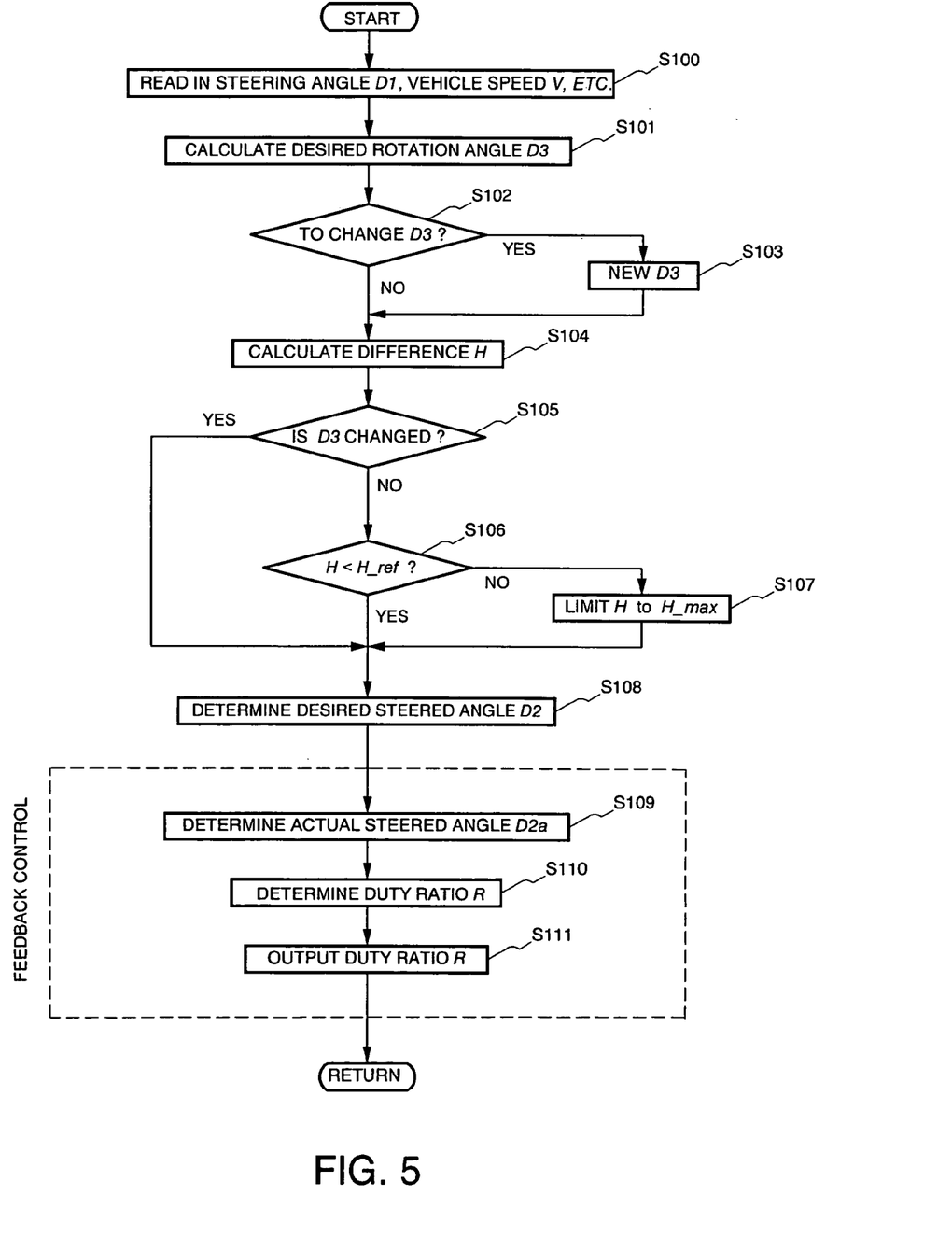
FIG. 5 is a flow chart illustrating a control process executed by the controller of the variable transmission ratio steering apparatus to limit the rotation speed of the electric motor thereof.

As to the way of controlling the driving of the electric motor 4 by the controller 3, the following description is made with reference to FIGS. 4 and 5.

FIG. 4 shows functional blocks of the controller 3 and connections therebetween which are necessary for limiting the rotation speed of the electric motor 4.

As shown in FIG. 4, the microcomputer 31 of the controller 3 includes a desired rotation angle calculation block 311, a difference calculation block 312, a difference limitation block 313, and a duty ratio determination block 314.

It is necessary to note here that the desired rotation angle calculation block 311, the difference calculation block 312, and the difference limitation block 313 constitute the desired rotation angle calculation unit, the difference calculation unit, and the difference limitation unit of the present invention respectively.

FIG. 5 shows a control process implemented by the microcomputer 31 to limit the rotation speed of the electric motor 4.

At the step S100 in FIG. 5, both the signal indicative of the steering angle D1 of the vehicle from the steering angle detecting circuit 39 and the signal indicative of the vehicle speed V from the communication I/F 38 are fed to the desired rotation angle calculation block 311 of the microcomputer 31.

In addition to the above two signals, command signals to mandatorily change the desired rotation angle D3 of the rotor 42 of the electric motor 4 are fed to the block 311 from the communication I/F 38. Such command signals are provided for suppressing unstable behavior of the vehicle when the vehicle encounters an unstable event.

At the step S101, a desired rotation angle D3 of the rotor 42 is calculated at intervals of a predetermined time, for example 2 ms, based on the steering angle D1 of the vehicle and the vehicle speed V. The calculation process is implemented in the desired rotation angle calculation block 311 of the microcomputer 31.

At the step S102, a determination is made as to whether to mandatorily change the calculated desired rotation angle D3 of the rotor 42. If a command signal to mandatorily change the desired rotation angle D3 of the rotor is received by the block 311 from the communication I/F 38, the currently calculated desired rotation angle D3 is mandatorily changed to a new value at the step S103, else the control process proceeds directly to the step S104.

At the step S104, a difference H between a first value and a second value of the desired rotation angle D3 of the rotor is calculated at intervals of the same predetermined time as at the step S101. Both the first value and the second value are selected from values calculated in the desired rotation angle calculation block 311, and the first value is calculated earlier than the second value by the predetermined time. The difference calculation process is implemented in the difference calculation block 312.

At the step S105, another determination is made as to whether to limit the calculated difference H. If the difference H is calculated using a mandatorily changed value of the desired rotation angle D3, the control process directly proceeds to the step S108 without difference limitation, so that the stabilities of the vehicle are secured, thereby assuring the safety of the vehicle.

At the step S106, a further determination is made as to whether the difference H calculated in the difference calculation block 312 exceeds a predetermined reference value H_ref. If the difference H exceeds the reference value H_ref, the control process proceeds to the next step S107, else proceeds directly to the step S108.

At the step S107, the difference His limited by replacing the difference H with an upper limit Hmax of the difference limitation block 313. In addition, the second value of the desired rotation angle D3 in calculating the currently limited difference H is recalculated based on the upper limit Hmax and the corresponding first value in the calculation. The limitation process is implemented in the difference limitation block 313 of the microcomputer 31.

Since the difference H corresponds to a rotation speed of the rotor 42 of the electric motor 4, the rotation speed of the rotor 42 can be limited by limiting the difference H through the difference limitation block 313.

It should be noted that the upper limit Hmax is preferably predetermined to be less than the reference value H_ref at the previous step S106. Moreover, the reference value H_ref is preferably predetermined to correspond to the rotation speed of the rotor 42 above which audible operation noises arise from the electric motor 4, whereby the operation noises can be minimized.

Further, as shown in FIG. 3, the variable transmission ratio steering apparatus 1 preferably includes a temperature detector 20, for example a thermistor, to detect the temperature of the electric motor 4. When the detected temperature exceeds a predetermined value, the controller 3 decreases the upper limit Hmax, so that the electric motor 4 can be protected from overheating.

Turning now to FIG. 5, at the step S108, a desired steered angle D2 of the vehicle (i.e., a desired rotation angle of the output shaft 13) is calculated at intervals of the same predetermined time as at the step S101. This calculation process is implemented in the duty ratio determination block 314 of the microcomputer 31, based on both the steering angle D1 of the vehicle and the desired rotation angle D3 of the rotor 42 of the electric motor 4.

At the step S109, an actual steered angle D2a of the vehicle is determined at intervals of a predetermined time, for example 200 μs, depending on the converted steered angle signal from the electrical angle detecting circuit 53. The determination process is implemented in the duty ratio determination block 314.

At the step S110, a duty ratio R to control the electric motor 4 is determined at intervals of the same predetermined time as at the previous step S109, based on both the desired steered angle D2 and the actual steered angle D2a of the vehicle. This duty ratio determination process is implemented in the duty ratio determination block 314.

At the final step S111, a PWM signal indicative of the determined duty ratio R is generated in the duty ratio determination block 314 and provided to the motor driving circuit 50.

By repeatedly executing the forgoing steps S109–S111, a feed back control of the electric motor 4 is implemented, whereby the desired steered angle D2 of the vehicle is given to the output shaft 13.

In the feed back control, the time interval for determining an actual steered angle D2a of the vehicle and the corresponding duty ratio R is predetermined shorter than that for the processes at the steps S101–S108, for example, 200 μs versus 2 ms. Since the desired steered angle D2 of the vehicle is calculated using a longer time interval of 2 ms, the computational load of the microcomputer 31 can be reduced.

To sum up, the variable transmission ratio steering apparatus 1 of the embodiment of the present invention advantageously limits the rotation speed of the rotor 42 of the electric motor 4, so that the audible operation noises arising form the electric motor 4 can be minimized without sacrificing the stabilities of the vehicle.

While the above particular embodiment of the invention has been shown and described, it will be understood by those who practice the invention and those skilled in the art that various modifications, changes, and improvements may be made to the invention without departing from the spirit of the disclosed concept. Such modifications, changes, and improvements within the skill of the art are intended to be covered by the appended claims.

What is claimed is:

1. A variable transmission ratio steering apparatus for a vehicle having a steering wheel and steerable road wheels, said apparatus comprising:

an input shaft coupled to the steering wheel;

a steering angle sensor for sensing a rotation angle of said input shaft and generating a signal indicative of the sensed rotation angle;

an output shaft operatively linked to the steerable road wheels;

an actuator having an electric motor with a rotor, the electric motor being operatively connected between said input shaft and said output shaft and configured to vary a transmission ratio between a rotation angle of said output shaft and the rotation angle of said input shaft; and a controller;

wherein said controller comprises:

a desired rotation angle calculation unit calculating, at intervals of a predetermined time, a desired rotation angle of the rotor of the electric motor depending on the signal indicative of the rotation angle of said input shaft from the steering angle sensor;

a difference calculation unit calculating, at intervals of the predetermined time, a difference between a first value and a second value selected from values of the desired rotation angle of the rotor calculated by said desired rotation angle calculation unit, the first value being calculated earlier than the second value by the predetermined time; and a difference limitation unit limiting, when the difference calculated by said difference calculation unit exceeds a predetermined reference value, the difference to an upper limit thereof.

2. The apparatus as set forth in claim 1, wherein the upper limit of said difference limitation unit is predetermined to allow a rotation speed of the rotor of the electric motor to be limited to a value above which audible operation noises arise from the electric motor.

3. The apparatus as set forth in claim 2, wherein functions of said difference limitation unit are not executed when the desired rotation angle of the rotor of the electric motor is changed upon receiving a signal for securing stabilities of the vehicle.

4. The apparatus as set forth in claim 3 further comprises a temperature detector detecting a temperature of the electric motor, wherein the upper limit of said difference limitation unit is decreased when the detected temperature of the electric motor exceeds a predetermined temperature value.

5. The apparatus as set forth in claim 4 further comprises a steered angle sensor for sensing the rotation angle of said output shaft and generating a signal indicative thereof, wherein said controller controls driving of the electric motor based on both the desired rotation angle of the rotor of the electric motor calculated by said desired rotation angle calculation unit and the rotation angle of said output shaft sensed by said steered angle sensor, the desired rotation angle of the rotor being recalculated when the difference is limited by said difference limitation unit.

6. The apparatus as set forth in claim 5, wherein said controller controls the driving of the electric motor depending on a speed of the vehicle detected by a speed detector of the vehicle.

7. The apparatus as set forth in claim 1, wherein functions of said difference limitation unit are not executed when the desired rotation angle of the rotor of the electric motor is changed upon receiving a signal for securing stabilities of the vehicle.

8. The apparatus as set forth in claim 1 further comprises a temperature detector detecting a temperature of the electric motor, wherein the upper limit of said difference limitation unit is decreased when the detected temperature of the electric motor exceeds a predetermined temperature value.

9. The apparatus as set forth in claim 1 further comprises a steered angle sensor for sensing the rotation angle of said output shaft and generating a signal indicative thereof, wherein said controller controls driving of the electric motor based on both the desired rotation angle of the rotor of the electric motor calculated by said desired rotation angle calculation unit and the rotation angle of said output shaft sensed by said steered angle sensor, the desired rotation angle of the rotor being recalculated when the difference is limited by said difference limitation unit.

10. The apparatus as set forth in claim 1, wherein said controller controls driving of the electric motor depending on a speed of the vehicle detected by a speed detector of the vehicle.

11. A variable transmission ratio steering apparatus for a vehicle having a steering wheel and steerable road wheels, said apparatus comprising:
an input shaft coupled to the steering wheel;
an output shaft operatively linked to the steerable road wheels;
an actuator having an electric motor, the electric motor being operatively connected between said input shaft and said output shaft and configured to vary a transmission ratio between a rotation angle of said output shaft and a rotation angle of said input shaft; and
a controller comprising limitation means for limiting a rotation speed of the electric motor to a value above which audible operation noises arise from the electric motor, wherein said controller stops executing functions of the limitation means upon receiving a predefined signal.

12. The apparatus as set forth in claim 11, wherein the predefined signal comprises a signal for securing stabilities of the vehicle.

13. A variable transmission ratio steering apparatus for a vehicle having a steering wheel and steerable road wheels, said apparatus comprising:
an input shaft coupled to the steering wheel;
a steering angle sensor for sensing a rotation angle of said input shaft and generating a signal indicative of the sensed rotation angle;
an output shaft operatively linked to the steerable road wheels;
an actuator having an electric motor with a rotor, the electric motor being operatively connected between said input shaft and said output shaft and configured to vary a transmission ratio between a rotation angle of said output shaft and the rotation angle of said input shaft;
desired rotation angle calculation means for calculating, at intervals of a predetermined time, a desired rotation angle of the rotor of the electric motor depending on the signal indicative of the rotation angle of said input shaft from the steering angle sensor;
difference calculation means for calculating, at intervals of the predetermined time, a difference between a first value and a second value selected from values of the desired rotation angle of the rotor calculated by said desired rotation angle calculation means, the first value being calculated earlier than the second value by the predetermined time; and
a difference limitation means limiting, when the difference calculated by said difference calculation means exceeds a predetermined reference value, the difference to an upper limit thereof.

* * * * *